Feb. 20, 1945.   N. C. CLARK ET AL   2,370,009
MONITORING DEVICE FOR SPOTWELDING MACHINES
Filed Feb. 11, 1943   4 Sheets-Sheet 1

FIG. 1

INVENTORS
NATHAN C. CLARK
PHILLIP R. CARLSON
BY George C. Sullivan

INVENTORS
NATHAN C. CLARK
PHILLIP R. CARLSON

UNITED STATES PATENT OFFICE 2,370,009

MONITORING DEVICE FOR SPOT-WELDING MACHINES

Nathan C. Clark, Los Angeles, and Phillip R. Carlson, Pasadena, Calif., assignors to Lockheed Aircraft Corporation, Burbank, Calif.

Application February 11, 1943, Serial No. 475,574

14 Claims. (Cl. 219—4)

This invention relates to welding apparatus and more particularly to an improved monitoring method and apparatus for continuously and instantly indicating the quality of each spotweld being made by an electric spotwelding machine.

The control of electric spotwelding machines to produce spotwelds of consistent quality particularly as to their shear strength, has been difficult to accomplish by reason of the numerous invisible variable factors involved such as, for example, the joined metal surface characteristics, electrode tip condiitons, fluctuation of welding current supply and welding tip pressure values, and other erratic and non-uniform operating characteristics inherent in present day welding equipment.

The strength of spotwelds has heretofore been determinable to a reasonable degree of certainty only by destructive methods such as by making one or a series of typical welds between metal sheets or structural elements of metal to be joined and testing the joint thus formed by subjecting it to tension or shear in a tension machine or other suitable apparatus. In production welding control, test welds were thus taken and tested at regular intervals and from the statistical data thus obtained conclusions reached as to the probable quality of the average intervening production welds.

This empirical method of welding quality control lacked positiveness and dependability, was slow and expensive, and had the great disadvantage that the indication that inferior welds were being made was had only after an indeterminate number of preceding welds of low quality had been made.

It is an object of the present invention to provide a non-destructive method for determining the strength of spotwelds.

It is a more general object of the present invention to eliminate the aforementioned uncertainties of spotwelding quality and to provide a monitoring means for more quickly and positively indicating the quality of each weld simultaneously with its formation so that a concurrent record of weld quality in production operations may be had and the various factors influencing the quality of welds instantly corrected and constantly maintained at optimum values.

It is a further object of this invention to provide means for indicating the approximate shear strength of each individual spotweld and to warn the spotwelding machine operator when a weld inferior to a predetermined minimum standard has been made.

It is a still further object of this invention to provide means for automatically locking the welding machine out of operation immediately following a spotweld of predetermined substandard quality.

It has been discovered that a good correlation exists between the shear strength of a spotweld and the volume of the molten metal produced in the weld during the welding operation, and it is also found that the volume of the metal thus melted is directly related to the energy released directly within the interior region of the weld during that initial fraction of the welding heating cycle in which melting occurs. The energy released in the balance of the welding cycle either before or after the melting occurs is found not to extend the weld and otherwise to have a neglible influence on the quality of the weld, and apparently serves only to supply sufficient additional heat to maintain the metal at a molten temperature for a short interval of time against the conduction and radiation heat losses to the surrounding metal and electrode tips.

Consequently, it follows that the weld quality may therefore be correlated with the said energy release within the weld during the melting time interval.

Accordingly, the invention in its broad aspect resides in a method and apparatus for selectively measuring the heat energy released within the interior of the weld during only a predetermined controlling portion of the welding heating cycle. The invention more specifically resides in a method and apparatus for selectively determining the useful fusion heat energy released directly within the weld in terms of the integral of the instantaneous products of the simultaneous variable current and voltage across the weld and the time during which these quantities persist for each weld and correlating the thus integrated values with weld quality.

These and other objects and features of novelty will become evident hereinafter.

In the accompanying drawings wherein a preferred embodiment of the invention is illustrated.

*Apparatus*

Figure 1:
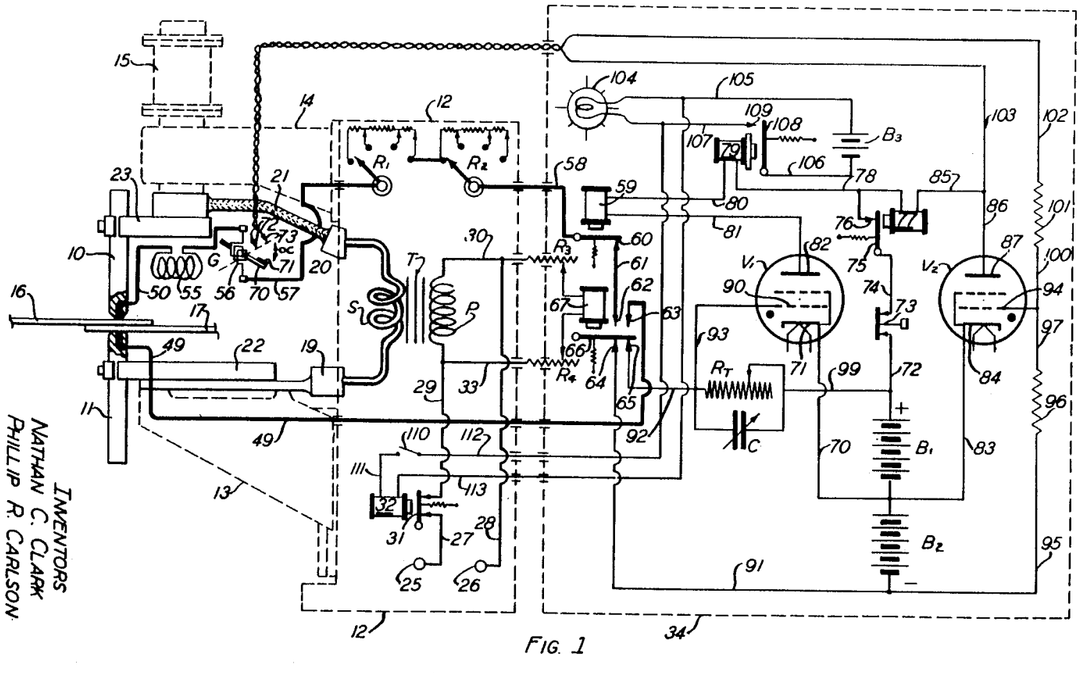
Figure 1 is a schematic view of a spot-welding machine showing the wiring diagram and general arrangement of the apparatus.
Figure 2:
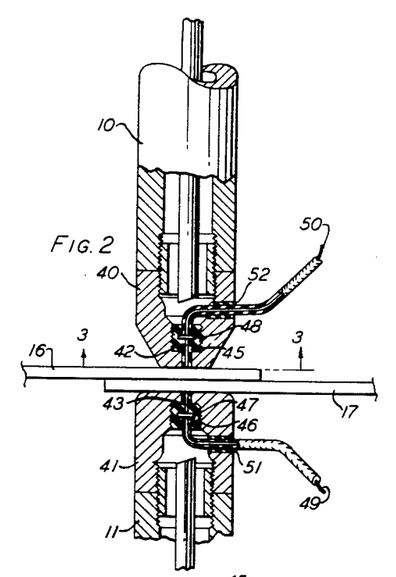
Figure 2 is an enlarged fragmentary cross-sectional elevation of the spotwelding electrodes of Figure 1.
Figure 3:
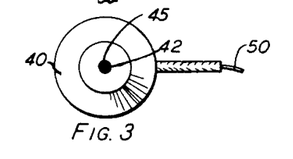
Figure 3 is an end view of the welding electrode tip taken on line 3—3 of Figure 2.

Referring primarily to Figures 1 and 2, the reference numerals 10 and 11 designate a pair of coaxially positioned spotwelding electrodes which, except for the modifications in construction best shown in Figures 2 to 5, are of the type commonly employed in the conventional spotwelding machine, a typical outline of which is indicated in place at 12. The electrodes 10 and 11 are supported in the spotwelder arms 13 and 14 in the usual manner and the upper electrode is adapted to be longitudinally reciprocated by means of a pneumatic cylinder indicated at 15 so as to separate the welding tips sufficiently to allow entrance and positioning of work pieces to be welded as shown at 16 and 17, and to close the electrode intermittently to apply the welding cycle pressure to the work pieces during the welding interval. Electrical connection for the heavy welding current from the secondary S of the spotwelding transformer T to the electrodes is made by way of terminal blocks 19 and 20, flexible conductor 21, and connector bars 22 and 23. The welding transformer magnetizing current is supplied to the primary P from the rectifier or other suitable direct current source and the switching and timing devices, not shown, by way of terminals 25 and 26, conductors 27, 28, 29 and 30, and relay bar 31 of relay 32. The beforementioned switching and timing devices, not shown, are adapted to effect simultaneous electrode pressure and current cycles as indicated by curves 35 and (*aghj*) in the graph of Figure 6, which are of typical form for the magnetic storage type of spotwelding machines.

The foregoing apparatus is that normally associated with or contained within the spotwelding machine. The following apparatus and electrical equipment associated with the spotwelding machine comprise the monitoring device of this invention.

The beforementioned spotwelding electrodes 10 and 11 are provided with welding tips 40 and 41 which may be of any of the shapes and materials commonly employed in commercial spotwelding machines except that these tips are modified in such a manner that a voltage pick-up probe electrode may be firmly attached to but insulated from the electrode tip, and located so as to lie within the area of contact of the welding tip with the material being welded. The ends of the voltage pick-up probes are positioned flush with the neighborhing faces of the electrode tip, and can be dressed and polished simultaneously with the normal tip dressing operation. This type of welding tip modification can be accomplished in several ways, for example, coaxially positioned holes may be drilled through the centers of the welding tip faces and into the cooling cavity through which the insulated probe electrodes 42 and 43 may be concentrically positioned in the manner shown in Figure 2. The outer ends of the probe electrodes are retained flush with the faces of the welding electrode tips so that when the welding electrodes are applied, as shown at 16 and 17 in Figures 1 and 2, the exposed ends of the probes will make positive electrical contact with the opposite surfaces of the work to be welded. The probe electrodes 42 and 43 are retained in proper position within the welding electrode tip by means of suitable insulating plugs as shown at 45 and 46, threaded into the counterbored interior extremities of the welding tip cooling cavities. The plugs 45 and 46 may be made of a suitable thermo-setting plastic cast around the probes and the probes may be securely held within the plugs against axial stresses incident upon contact with the work pieces by means of disc inserts integral with said probes as shown at 47 and 48. Insulated conductor leads 49 and 50 extending from the probe inserts may be brought out through the sides of the electrodes through suitable insultaing bushings which make liquid tight seals between the insulated leads and the electrode walls as shown at 51 and 52. The insulation on the wire leads 49 and 51 within the cooling cavities may be an enamel coating or other suitable insulating material such as rubber, plastic, mica, or the like. The extensions of the beforementioned leads 49 and 50 make connection to the monitoring apparatus as follows:

The conductor lead 50 makes connection in series with an adjustable air cored inductor balancing coil 55 to the armature coil 56 of a ballistic type of galvanometer G, and thence through conductor 57, series connected rheostats $R_1$ and $R_2$ and through conductor 58 to the armature of relay 59 which normally makes closed contact at 60 with conductor 61. Conductor 49 leads to contactor 62 of relay 67.

The beforementioned ballistic galvanometer G comprises an air-cored galvanometer coil 56 rotatably supported for limited rotation about a vertical axis upon torsion filaments as is common practice. This galvanometer, however, differs from the usual types in not being provided with the usual field magnets. The necessary magnetic field for actuating the armature coil 56 is provided in the space occupied by the galvanometer coil by the flow of welding current in the loop formed by the beforementioned welding current circuit comprising conductor 21, connector bar 23, electrodes 10 and 11, and connector bar 22, and for this reason the galvanometer must be firmly supported by suitable means in a predetermined fixed location and position with respect to the welding current circuit loop and within the electromagnetic field induced by it. The galvanometer coil carries an arm 70 having a contactor bar 71 adapted at the limit of its swing to close the circuit between stationary contact point 72 and 73.

The electronic timing and control apparatus which may, in general, be housed in a separate container indicated by the dotted enclosure 34 comprises the following:

The coil of relay 67 is connected in shunt to the primary winding P of the welding transformer through fixed or variable resistances $R_3$ and $R_4$ and conductors 30 and 33.

$V_1$ and $V_2$ are gas filled grid controlled electron tubes of the Thryatron type. The plate potential of electron tube $V_1$ is applied from battery $B_1$ through conductor 70 leading to the cathodes 71 and conductor 72, push button switch 73, conductor 74, armature 75 and contact point 76 of relay 77 and conductor 78, the field coil of relay 79, conductor 80, field coil of relay 59 and finally through conductor 81 to the plate 82. The plate potential is applied to the electron tube $V_2$ from battery $B_1$ by way of conductor 83 leading from the negative terminal of the battery to the cathode 84 and from the positive terminal of the battery through conductor 72, push button switch 73, conductor 74, armature 75, contact 76, the field coil of relay 77 and finally through conductors 85 and 86 to the plate 87.

The discharge control-grid 90 of electron tube $V_1$ is normally maintained at a suitable negative potential with respect to the cathode 71 by means of the grid battery $B_2$, the positive terminal of which makes connection with the cathode through conductor 70 and the negative terminal of which normally makes connection with the grid 90 through conductor 91, contacts 64 and 65 and conductor 92 and 93. A timing circuit for the control grid 90 of the electron tube $V_1$ comprising a variable capacity C and a shunt connected variable resistance $R_t$ is connected in shunt across batteries $B_1$ and $B_2$ by way of conductors 91 and 92 on the negative side and conductor 99 on the positive side when the circuit between contact points 64 and 65 of relay 67 is completed through armature 66 as shown. The discharge control grid 94 of electron tube $V_2$ is also normally maintained at a suitable negative potential with respect to the cathode 84 by means of the grid battery $B_2$, the positive terminal of which makes connection with the cathode through conductor 83 and the negative terminal of which makes connection with the grid 94 through conductor 95, resistance 96 and conductor 97. The control grid 94 of electron tube $V_2$ may be connected to the plate 87 to drop the negative grid control voltage, when the galvanometer actuated contacts 72 and 73 are closed, through conductor 100, resistance 101 and conductors 102 and 103.

An incandescent type warning light 104 is adapted to be lighted by means of a suitable battery $B_3$ when the circuit comprising conductors 105, 106 and 107 is completed through armature 108 to contact point 109 by delayed action relay 79. The armature of a lockout relay 32 may be connected in parallel with the circuit leading to the warning light 105 by way of switch 110 and conductors 111, 112 and 113 for simultaneous or independent actuation.

The operation of the apparatus is as follows:

The work pieces to be spotwelded are placed in position in the spotwelding machine and the electrodes closed upon them as shown at 16 and 17 in Figures 1 and 2, and the welding cycle performed in the usual well known manner. In the magnetic storage type of spotwelder the typical welding cycle for each weld appears as shown in Figure 6 in which the simultaneous, instantaneous values of the variable electrode force and primary voltage and electrode or secondary welding current values are shown.

The D. C. supply from the rectifiers and switching mechanism, not shown, is connected to the welding machine at terminals 25 and 26 and flows to the welding transformer primary through the conductors 27, 28, 29 and 30 and closed relay contacts 31. During the magnetizing interval the primary magnetizing current flowing in this circuit and initiated at $a$ rises to a value of $b$ where the circuit breakers commence opening, after which the primary current rapidly drops off to zero, as indicated at $d$. A resultant induced secondary current $ag$ flows through the welding circuit during the magnetizing interval with a final heavy current surge of opposite polarity as indicated at $ghj$ induced by the rapid collapse of the magnetic flux during the beforementioned breaking interval $bd$. The thus induced secondary current $aghj$ flows through the welding circuit which consists of the beforementioned terminal block 19, electrode support 22, electrode tip 11, work pieces 16 and 17, electrode tip 10, support 23, flexible conductor 21 and return to terminal block 20. It has been discovered that the initial flow of current $ag$ through the welding circuit during the magnetizing interval is insufficient to effect any material fusion of the contacting surfaces of the work pieces to be spotwelded, but that substantially all of the useful melting of the metal within the weld contributing to the making of the actual weld occurs and is completed during the interval $gh$ a period of time in the order of .01 to .02 second, when the most intense flow of induced secondary current occurs. During the balance of the secondary current flow $hj$ the additional heat released in the weld during that interval is found not to result in any material increase in the volume of the molten metal in the weld but only to supply sufficient heat to maintain equilibrium between the heat supplied and heat lost through radiation and conduction into the electrodes and the metal body surrounding the weld. The time interval and the energy release within the weld which accordingly has been found to be controlling with respect to the resultant shear strength of the weld is that approximately represented by the cross-hatched area under the welding current curve $gh$, and it is this energy input to the weld which it is desired selectively to measure by the device of this invention for monitoring weld strength in the manner and by means of the apparatus hereinafter more fully described.

During the flow of welding current from the welding transformer secondary and through the work pieces 16 and 17 held between electrodes 10 and 11, as before described, the resultant $ir$ drop through the work pieces and the weld is picked up by the ends of the pick-up or probe electrodes 42 and 43.

Figure 6:
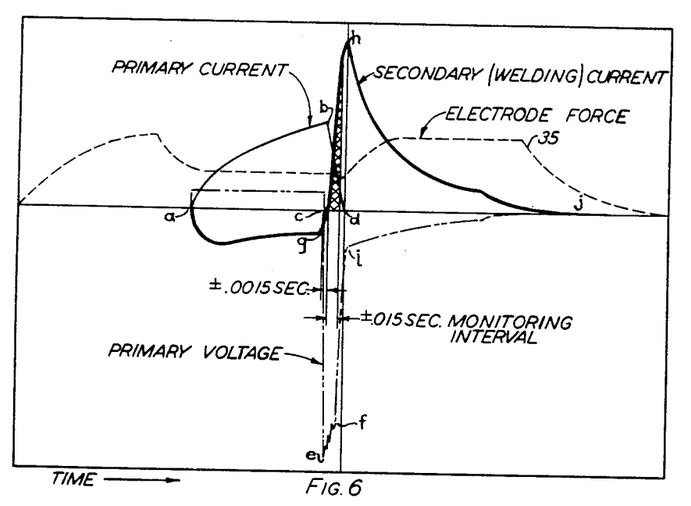
Figure 6 is a typical spotwelding cycle diagram for the magnetic storage type of spotwelding apparatus.

During the initial secondary current flow during the magnetizing interval as shown at $ag$ in Figure 6, the pick-up circuit leading from the pick-up electrodes 42 and 43 through the balancing coil 55, galvanometer coil 56, rheostats $R_1$ and $R_2$ conductor 58, contact 60 and conductor 61 and the return through the conductor 49 is open at contact points 62 and 63 of the initiating relay 67. The galvanometer is thus inactive during this portion of the welding cycle.

At the instant the primary current of the welding transformer is commenced to be interrupted by the series of breakers as indicated at $b$ in Figure 6, the impressed primary voltage which had been substantially constant and of relatively low value during the magnetizing interval, as indicated at $a$—$c$ in Figure 6, suddenly rises to a high induced value of opposite sign as indicated at $ce$ due to the rapid decrease of the magnetic flux in the transformer field and this induced high potential across the primary may remain relatively great during the progressive interruption of the primary current and until the primary current falls to zero at $d$ as indicated at $cefl$ in Figure 6.

The initiating relay 67 which is connected across the transformer primary P through conductors 30 and 33 and resistances R₃ and R₄ is of such electrical and mechanical characteristics as to be inoperative under the relatively low impressed primary voltage of the magnetizing interval but operative under the high induced potential $c_e$ occurring at the instant of breaking of the primary current and the simultaneous commencement of the up-surge of the secondary welding current $gh$. At this point $ce$ the initiating relay 67 is actuated simultaneously to open the circuit between contacts 64 and 65 and to close the pick-up circuit between contacts 62 and 63.

Upon thus closing the pick-up circuit through contacts 62 and 63, a variable current, directly proportional to the variable $ir$ drop across the weld area in the work pieces, flows through the said pick-up circuit and through the galvanometer coil 56, and the galvanometer coil being positioned within the magnetic field induced by the flow of current in the welding circuit is acted upon by the force produced by the interaction of the resultant electromagnetic fields. The force acting on the galvanometer coil is thus directly proportional to the simultaneous instantaneous values of the product of the welding current and the $ir$ drop across the weld area. The deflection of the ballistic galvanometer G will thus be proportional to the energy imparted to the galvanometer coil which energy will be the integral of the product of the simultaneous, instantaneous values of welding current and the $ir$ drop across the weld and time, or $\int eidt$.

During the time in the welding cycle prior to the actuation of the relay 67 which initiates the monitoring interval, the circuit between contacts 64 and 65 are closed, thus impressing the full voltage of batteries B₁ and B₂ across the shunt connected resistance R$_t$ and capacity C of the monitoring interval timing circuit. At the same time the control grid 90 is thereby maintained at a sufficiently high negative value with respect to the cathode 71 to prevent ignition of the Thyratron V₁. At the instant of opening the contacts 64 and 65 by the relay 67 the condenser C being thus disconnected from the negative terminal of battery B₂ will discharge through resistance R$_t$ over a period of time which is a function of the relative values of R$_t$, C and the applied potential difference. For a portion of this discharging time interval the potential drop across R$_t$ is sufficient to maintain the required negative potential on the control grid 90 to prevent ignition and conductivity of the electron tube V₁. However, when the potential across C and R$_t$ has dropped below the minimum value at which the grid 90 can maintain control, the tube V₁ becomes conductive, allowing current to flow from battery B₁ through conductor 70 to the cathode 71, through the tube V₁ to the plate 82 and return through the relay field coils 59 and 79 by way of conductors 81, 80, 78, 74 and 72. This current flow through the field coil of relay 59 opens the pick-up circuit at contact 60 thus terminating the activity of the pick-up circuit. The period of activity of the welding pick-up cycle initiated at the first surge of welding current is thus limited to a period of time determined by the characteristics of the timing circuit R$_t$C as before described, and this period may be in the order of .008 to .030 second duration. For this purpose the condenser C may have a capacity of approximately .225 microfarad and the resistance R$_t$ approximately 280,000 ohms.

During the monitoring pick-up interval the ballistic galvanometer coil 56 carrying contact bar 71 is imparted a rotational impulse whereby its angular displacement will be proportional to the energy released in the weld area. If the impulse is sufficient to rotate the bar 71 into contact with the contacts 72 and 73 the control grid 94 of the electron tube V₂ will be shorted to the plate 87 by way of conductor 100, resistance 101, conductors 102, 103 and 86. The electron tube V₂ which up to this time had been non-conductive by reason of the negative potential maintained on the said control grid 94 by the battery B₂, becomes conductive momentarily allowing current to flow from the plate 87 through the field coil of the relay 77 and return to battery B₁ through contact 76, conductors 74 and 72 and switch 73. This flow of current through the field coil of the relay 77 immediately opens the contacts at 76 thus interrupting the current supply from battery B₁ thus reestablishing conditions of non-conductivity in both of the electron tubes V₁ and V₂.

The ballistic galvanometer G is preferably constructed to have a period of approximately one second and the stationary contacts 72 and 73 in the monitoring circuit are adjustable in angular position $\alpha$ relative to the neutral or at-rest position of arm 70 for completion of the circuit by the bar 71 for any desired minimum impulse from the monitoring pick-up circuit. The time interval required for the swing of the galvanometer coil 56 and the attached arm 70 carrying the contact bar 71 through the angle $\alpha$ to the contacts 72, 73 should be in the order of 0.1 to 0.5 second, during which time the induced secondary voltage which initiated the monitoring pick-up cycle will have fallen to a value below that required to energize the initiating relay 67. The relay 67 being then de-energized, the armature 66 will return to the position shown in Figure 1 re-establishing contact between points 64 and 65, which results in turn in reestablishing the negative control voltage on grid 90 of the electron tube V₁. At this point, one spotwelding monitoring cycle will have been completed and the circuit will be ready for repetition of a monitoring cycle for a subsequent spotweld.

If for any reason the energy released within any given spotweld as picked up by the monitoring circuit is insufficient to give the galvanometer G an impulse of predetermined energy value as determined by the angular position of contacts 72 and 73, the circuit comprising conductors 102 and 103 across the plate 87 and the control grid 94 will remain open resulting in continued non-conductivity of the electron tube V₂, which in turn will prevent the opening of relay 77 to extinguish the electron tube V₁. The relay 79 is of the delayed action type requiring approximately 0.5 second for its operation. If the galvanometer impulse is insufficient to close the contacts 72 and 73, as just mentioned, the electron tube V₂ will not be brought into action to extinguish electron tube V₁ and hence the current flowing through V₁ will continue to act upon the relay 79 eventually actuating it to effect contact between points 108 and 109 completing the battery B₂ circuit through the warning light 104. The resultant flashing of the light 104 serves as a signal to the operator that the preceding spotweld received heating energy which was below the predetermined minimum for the required strength and that the monitoring circuit has been rendered inactive by reason of the circuit failure to extinguish the electron tube V₁. In such cases the monitoring timing circuit may be manually restored to readiness for further monitoring by opening the battery circuit at the push-button switch 13 which extinguishes electron tube V₁.

In addition to, or alternative to, the warning light 104, the relay 32 may be actuated by closing switch 110 in the same manner to open the spotwelder primary current supply following a substandard spotweld.

Figure 8:
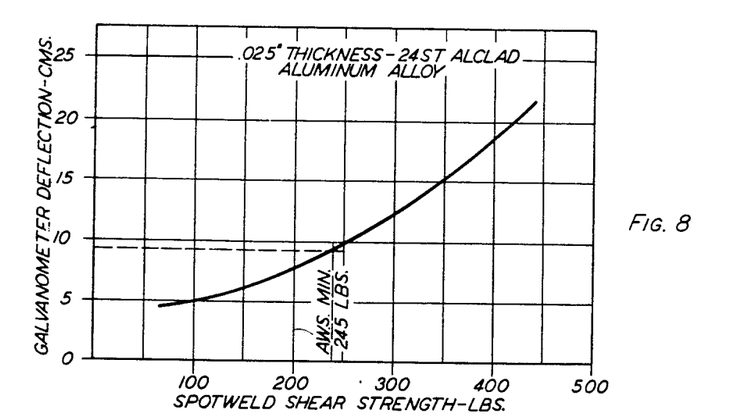
Figures 8 and 9 are graphs illustrating the correlation between spotweld strength and energy released within the weld.
Figure 9:
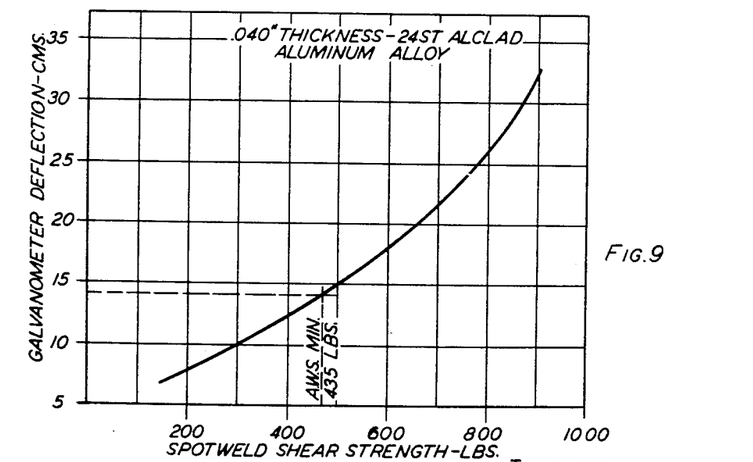

Referring now primarily to Figures 8 and 9, the approximate relations between galvanometer impulse and spotweld shearing strength are graphically represented for two different welding conditions. Figure 8 indicates the galvanometer deflection—spotweld strength relationship for spotwelds made between two overlapping .025" thicknesses of 24ST Alclad aluminum alloy, and Figure 9 indicates the same relationship for .040 thicknesses of 24ST Alclad aluminum alloy. The galvanometer deflections constituting the ordinates of the curves may be considered to be the direct function of the circumferential distance through which the contactor bar 71 on the galvanometer arm 70 moves for each monitored welding impulse picked-up by the probe electrodes 42 and 43. If the minimum allowable spotweld shear strength is to be fixed at some predetermined value such as, for example, the A. W. S. minimum of 245 lbs. as indicated by the vertical dotted abscissa line of that value on the graph, the contact points 72 and 73 must be adjusted in angular position α with respect to the galvanometer axis such that the circumferential length of the arc subtended by the angle α at the radial distance of the contact bar 70 corresponds to the ordinate of 9.5 as indicated by the intersecting horizontal dotted line. Thus any monitored impulse which fails to swing the galvanometer arm 70 and contacts 71 through an arc at least as great as that corresponding to a 9.5 cm. deflection will actuate the monitoring warning signal and will always accompany a spotweld strength falling on that part of the curve whose abscissa are below the selected minimum strength of 245 lbs. All impulses of greater than minimum amplitude will close the galvanometer contacts which will actuate the monitoring device to prevent the warning signal or lock-out of the welding current supply.

Instead of making an adjustment of the circumferential position of the contacts 72 and 73 for each thickness of material to be welded, these contacts may be fixed in position and the series connected rheostats R₁ and R₂ may be adjusted to regulate the galvanometer impulse to the same effect. For convenience of operation the rheostats R₁ and R₂ may be calibrated for monitoring different thicknesses and combinations of thicknesses of sheet material to be welded. For example, the setting of R₁ may be calibrated in terms of the thickness of one sheet and R₂ in terms of the thickness of the other of the two sheets to be spotwelded together in such a manner that the total series resistances of the rheostats is that required to obtain the required galvanometer deflection for effective monitoring. Similarly, adjustments may be made to afford monitoring of welds in three or more thicknesses.

During the welding current surge in the welding circuit an intense variable electromagnetic field is induced in the surrounding space through which the monitoring circuit leading from the pick-up electrodes 42 and 43 pass in inductive relation. To prevent spurious inductive pick-up in this monitoring circuit the series connected balancing coil 55 having a plurality of turns of wire is placed in inductive relation to the welding circuit, and adjusted in position so that the induced potential therein is equal and opposite to the induced voltage in the circuit of the galvanometer coil whereby the net inductive impulse in this circuit is zero.

Figure 7:
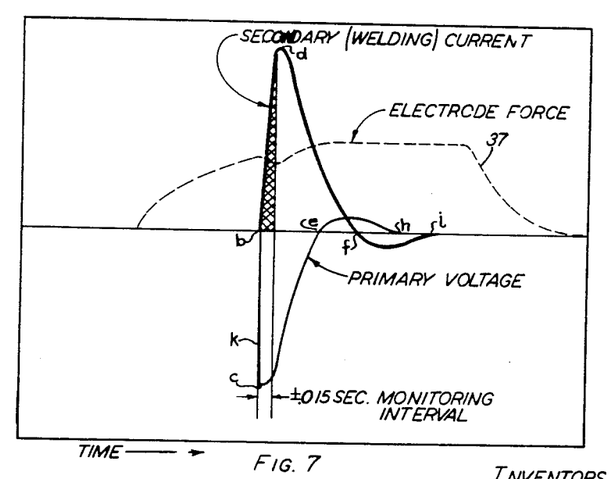
Figure 7 is a typical spotwelding cycle diagram for the capacity storage type of spotwelding apparatus.

Referring now to Figure 7, a typical welding cycle for a condenser storage type of spotwelder is illustrated. The secondary or welding electrode current-time wave is shown at $bdfl$. The voltage impressed upon the welding transformer primary upon connection to the charged condenser during the welding interval is shown at $bceh$, the initial impressed primary voltage being at $c$. In monitoring this type of welding cycle the initiating relay 67 is adapted to be actuated when the primary voltage reaches a suitable value somewhat less than the full initial condenser voltage shown at $c$ for example at some such point as indicated at $k$ in the curve between $b$ and $c$. Otherwise the monitoring timing device operates in the manner hereinbefore described, to pick-up the initial portion of the welding current cycle indicated by the cross-hatching in Figure 7 during which the strength controlling portion of the energy release within the weld area takes place.

Figure 4:
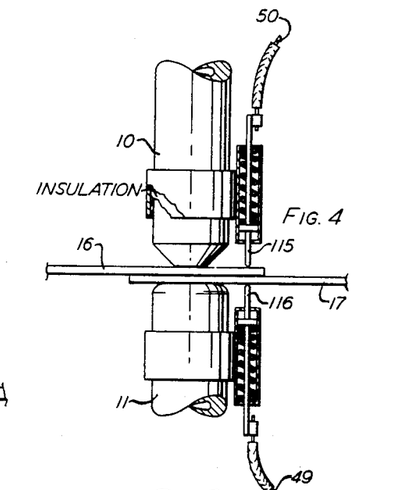
Figures 4, 5 and 10 are enlarged fragmentary details of modified welding tip arrangements.
Figure 5:
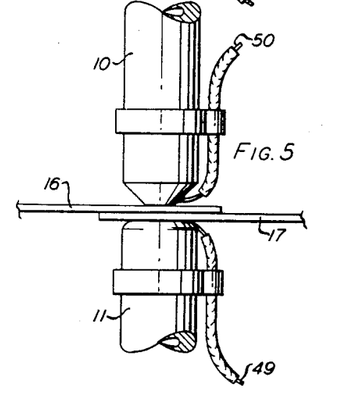
Figure 10:
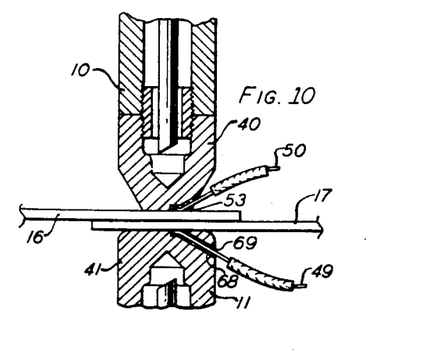

Figures 4, 5 and 10 show optional methods of effecting a pick-up of the $ir$ drop through the work pieces being welded. In Figure 4 the spring loaded electrodes 115 and 116 contact the opposite surfaces of the sheets 16 and 17 at equal distances from the axis of the weld and hence pick-up a potential difference which may be proportional to or a function of the actual $ir$ drop across the mid-portion of the spotweld area. In Figure 5 the monitoring circuit leads 49 and 50 are connected directly to the electrode tips as close as possible to the contacting end faces. In this arrangement the potential picked up is the total $ir$ drop between electrode tips which includes the $ir$ drops between each electrode tip and work sheet through which the heavy welding current passes. In Figure 10 a simplified arrangement is provided for exclusively picking up the $ir$ drop across the weld in the work piece in a manner similar to that shown in Figure 2. In this arrangement the conductor 50 is retained in a narrow groove 53 formed in the contact area of the upper welding tip and electrically isolated therefrom by means of an intermediate layer of suitable cementitious insulating material as shown at 54. A thermosetting plastic may be employed for this purpose. The conductor 49 may be retained in the lower electrode tip in the same manner as that shown for the upper electrode or it may be inserted through a drilled hole 68 containing an insulating body as shown at 69. The innermost portions of conductors 49 and 50 which present flush, exposed surfaces within the contact area of the welding tips are preferably positioned a distance of approximately 0.10 to 0.15 inch off-center from the longitudinal axis of the welding tip in order to minimize the compressive forces to which the wires and its retaining insulating material are subjected during the welding pressure cycle. The arrangements of Figure 2 and 10 are preferable to that of Figure 5 since the flow of current into the monitoring circuit in the arrangement of Figures 2 and 10 is so low that the contact resistance between the probe electrodes and work piece surfaces has negligible effect upon the indicated $ir$ drop through the weld area.

The data graphically illustrated in Figures 8 and 9 by means of which the monitoring spotweld strength correlation is effected may be determined by performing typical spotwelding operations on any given material under varying known conditions of current intensity electrode pressure and work piece surface conditions observing and recording the galvanometer swing for each weld and testing the corresponding resultant spotwelds to determine their shearing strength. The data thus obtained forms the basis for deriving curves of the types of Figure 8 and 9. By testing various thicknesses and combinations of thicknesses of various materials to be spotwelded, as many correlation curves as are needed may be empirically derived and as beforementioned the rheostats $R_1$ and $R_2$ may be calibrated with as many contact points as is necessary to accommodate the monitoring apparatus to proper operation with any of such combinations of thicknesses of materials. For convenience, in utilizing the rheostatic adjustment in spotwelding monitoring, the beforementioned curves of the type shown in Figures 8 and 9 may be plotted with ordinates indicated in terms of rheostat resistances or settings instead of galvanometer deflection.

The electron tubes $V_1$ and $V_2$ employed in the monitoring circuit may be of any of the well known gas containing types of suitable characteristics such as for example the Thyratron pentode No. 2050 manufactured by the Radio Corporation of America.

The electromagnetic relays 59 and 67 may be of any suitable type having periods of operation of approximately .002 second or less such as Sigma Mod. 3A manufactured by the Sigma Instrument Company, and relays 71 and 32 may have a period of operation of .02 or less, such as manufactured by the Leach Relay Company.

For Thyratron tubes of the beforementioned type the batteries $B_1$ and $B_2$ may have voltages of 90 volts and 45 volts respectively.

The foregoing is merely illustrative of a preferred method and embodiment of the invention and is not to be considered limiting. Many variations may be made by those skilled in the art and the invention is to be understood to include any method and apparatus which accomplishes the objects of the invention within the scope of the appended claims.

We claim:

1. In combination with a spotwelding machine a spotweld monitor comprising a pair of electrodes adapted to contact opposite surfaces of the workpiece adjacent the spotwelding electrode tips whereby a potential difference which is a function of the instantaneous $ir$ drop directly across the workpiece through the weld may be impressed across them, and a galvanometer coil electrically connected across said electrodes and positioned within the magnetic field induced by the welding current flowing to the welding electrode tips whereby during a welding cycle a current may flow from said electrodes through said galvanometer which is a function of the said impressed potential and whereby the resultant electrodynamic impulse on said galvanometer coil may be a function of the $\int eidt$ through the weld in said workpiece.

2. In combination with a spotwelding machine a spotweld monitor comprising a pair of electrodes adapted to contact opposite surfaces of the workpiece adjacent the spotwelding electrode tips whereby a potential difference substantially proportional to the instantaneous $ir$ drop directly across the workpiece through the weld may be impressed across them, and a galvanometer coil adapted to be electrically connected across said electrodes and positioned within the magnetic field induced by the welding current flowing to the welding electrode tips, and timing means actuated by said spotwelding machine and adapted to render said galvanometer operative only during a predetermined fractional portion of the welding current cycle whereby during a welding cycle, current may flow from said electrodes through said galvanometer substantially proportional to said impressed potential during said predetermined fractional portion of the welding cycle and whereby the resultant electrodynamic impulse imparted to said galvanometer coil may be substantially proportional to the $\int eidt$ through the weld in said workpiece during the operative period of said galvanometer.

3. In combination with a spotwelding machine a spotweld monitor comprising a pair of electrodes adapted to contact opposite surfaces of the workpiece coaxial with the spotweld whereby a potential difference proportional to the instantaneous $ir$ drop directly across the workpiece through the weld may be impressed across them, and a galvanometer coil adapted to be electrically connected across said electrodes and positioned within the magnetic field induced by the welding current flowing to the welding electrode tips, and timing means actuated by said spotwelding machine and adapted to render said galvanometer operative only during a predetermined fractional portion of the welding current cycle whereby during a welding cycle, current may flow from said electrodes through said galvanometer proportional to said impressed potential during said predetermined fractional portion of the welding cycle and whereby the resultant electrodynamic impulse imparted to said galvanometer coil may be proportional to the $\int eidt$ through the weld in said workpiece during the operative period of said galvanometer.

4. Apparatus according to claim 2 in which the said timing means comprises switching means adapted to connect said galvanometer coil across said electrodes during a predetermined fractional portion of the welding current cycle.

5. Apparatus according to claim 2 in which the said timing means comprises switching means adapted to connect said galvanometer coil across said electrodes only during the initial up-surge portion of the welding current cycle.

6. Apparatus according to claim 2 and an indicator associated with said electrodes and said galvanometer coil adapted to be operated when said impulse falls below a predetermined minimum value.

7. In combination with a resistance welding machine having a pair of electrodes for receiving a work piece therebetween, monitoring apparatus comprising, means for measuring electrical energy delivered into said work piece during a welding cycle, means responsive to the voltage drop across and the current flow through said work piece during said cycle for actuating said measuring means, and means for limiting the time period of said measuring to a predetermined fractional portion of said cycle.

8. In combination with a resistance welding machine having a pair of electrodes for receiving a work piece therebetween and a circuit for supplying welding current to said electrodes, monitoring apparatus comprising, means for measuring electrical energy delivered into said work piece during a welding cycle, means responsive to the voltage drop across said work piece and the current flow through said circuit during said cycle for actuating said measuring means, electrical connections completing a circuit between said responsive means and said electrodes, at least a portion of said last mentioned circuit having voltages induced therein by the changing magnetic field produced by welding current flow in said circuit, means for balancing out said induced voltages and means for limiting the time period of said measuring to a predetermined fractional portion of the welding cycle.

9. In combination with a spot welding machine of the stored energy type having a pair of electrodes for receiving a work piece therebetween, monitoring apparatus comprising, means for measuring electrical energy delivered into said work piece during a welding cycle, means responsive to the voltage drop across and the current flow through said work piece during said cycle for actuating said measuring means, and means for limiting the time period of said measuring to that of the initial up-surge of the welding current following release of said stored energy.

10. In combination with a spot welding machine of the stored energy type having a pair of electrodes for receiving a work piece therebetween and a circuit for supplying welding current to said electrodes, monitoring apparatus comprising, means for measuring electrical energy delivered into said work piece during a welding cycle, means responsive to the voltage drop across said work piece and the current flow through said circuit during said cycle for actuating said measuring means, electrical connections completing a circuit between said responsive means and said electrodes, at least a portion of said last mentioned circuit having voltages induced therein by the changing magnetic field produced by welding current flow in said circuit, means for balancing out said induced voltages and means for limiting the time period of said measuring to that of the initial up-surge of the welding current following release of said stored energy.

11. The method of monitoring a welding operation in a resistance welding machine having a pair of electrodes for receiving a work piece therebetween, which method comprises, measuring electrical energy delivered into said work piece during a welding cycle in response to the voltage drop across and the welding current flow through said work piece during said cycle, and limiting the time period of said measuring to a predetermined fractional portion of said cycle.

12. The method defined in claim 11, which includes the step of balancing out inductive voltages interfering with said measuring and due to a changing magnetic field produced by welding current flow in said machine during said welding cycle.

13. The method of monitoring a welding operation in a spot welding machine of the stored energy type having a pair of electrodes for receiving a work piece therebetween, which method comprises, measuring electrical energy delivered into said work piece during a welding cycle in response to the voltage drop across and the welding current flow through said work piece during said cycle, and limiting the time period of said measuring to that of the initial up-surge of said welding current following release of said stored energy.

14. In combination with a spotwelding machine, a spotweld monitor comprising, a pair of electrodes adapted to contact opposite surfaces of the work piece adjacent the spotweld, whereby a potential difference which is a function of the instantaneous $ir$ drop directly across the work piece and through the weld may be impressed across them, and a galvanometer coil electrically connected across said electrodes and positioned within the magnetic field induced by the welding current flowing to the weld whereby during a welding cycle a current may flow from said electrodes through said galvanometer coil which is a function of the said impressed potential and whereby the resultant electrodynamic impulse on said galvanometer coil may be a function of the $\int e i dt$ through the weld in said work piece.

NATHAN C. CLARK.
PHILLIP R. CARLSON.